Sept. 2, 1930. H. G. BARTHOLOMEW ET AL Re. 17,793

TELAUTOGRAPHY

Original Filed July 3, 1922 7 Sheets-Sheet 1

Inventors
Harry Guy Bartholomew
and Maynard Leslie Deeds McFarlane
By George Ramsey
Their Attorney

TELAUTOGRAPHY

Original Filed July 3, 1922 7 Sheets-Sheet 2

Inventors
Harry Guy Bartholomew
and Maynard Leslie Deedes McFarlane
By George Ramsey
their Attorney

TELAUTOGRAPHY

Original Filed July 3, 1922 7 Sheets-Sheet 3

Inventors
Harry Guy Bartholomew
and Maynard Leslie Deedes McFarlane
By George Ramsey
their Attorney

TELAUTOGRAPHY

Original Filed July 3, 1922 7 Sheets-Sheet 4

Inventors
Harry Guy Bartholomew
and Maynard Leslie Deedes McFarlane
By George Ramsey
their Attorney

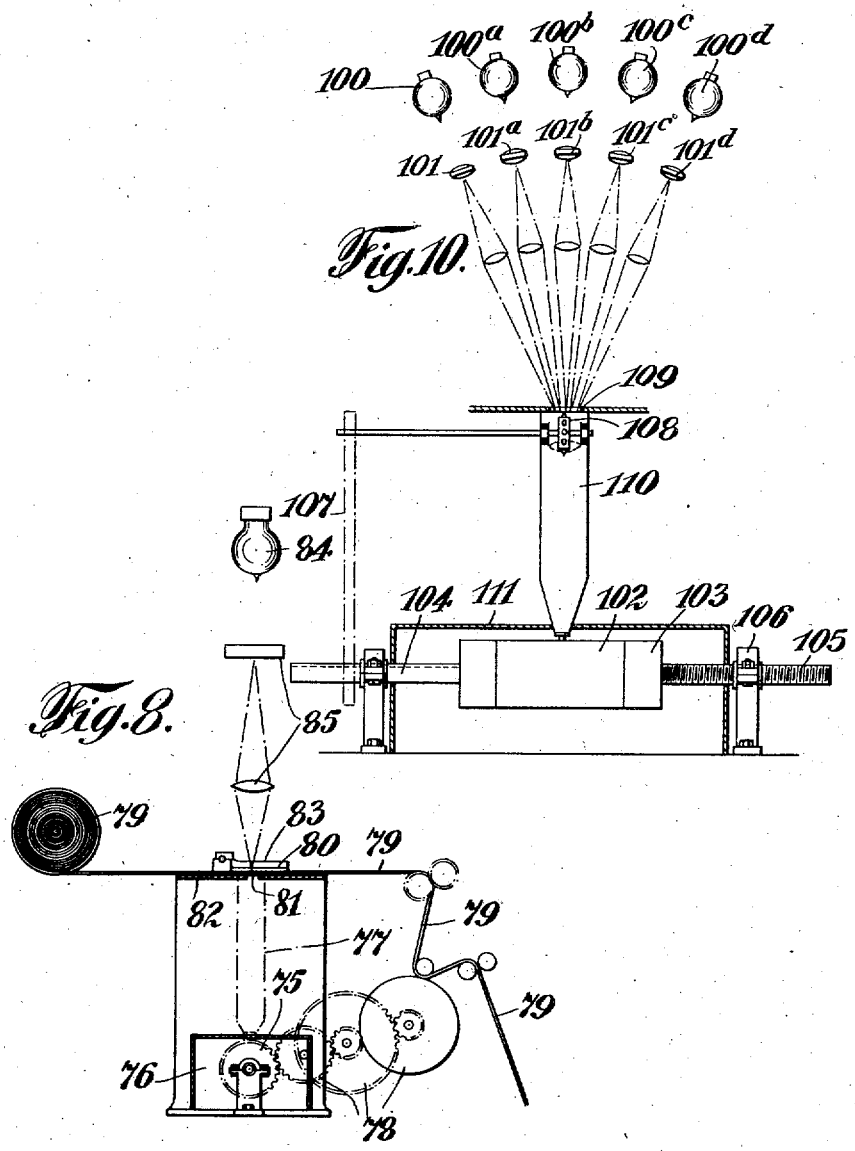
Inventors
Harry Guy Bartholomew
and Maynard Leslie Deedes McFarlane
By George Ramsey
their Attorney

TELAUTOGRAPHY

Original Filed July 3, 1922 7 Sheets-Sheet 6

Inventors
Harry Guy Bartholomew
and Maynard Leslie Deedes McFarlane
By George Ramsey
their Attorney

TELAUTOGRAPHY

Original Filed July 3, 1922 7 Sheets-Sheet 7

Inventors
Harry Guy Bartholomew
and Maynard Leslie Deedes McFarlane
By George Ramsey
Attorney Reissued Sept. 2, 1930 Re. 17,793

UNITED STATES PATENT OFFICE

HARRY GUY BARTHOLOMEW, OF LONDON, ENGLAND, AND MAYNARD LESLIE DEEDES McFARLANE, OF NEW YORK, N. Y.

TELAUTOGRAPHY

Original No. 1,653,425, dated December 20, 1927, Serial No. 572,664, filed July 3, 1922, and in Great Britain September 19, 1921. Application for reissue filed June 4, 1929. Serial No. 368,304.

This invention relates to phototelegraphy.

The main objection to known processes of telautography or phototelegraphy is due to the time occupied in coding, the transmission of the coded message, and in decoding.

By "coding" in the preceding paragraph is meant the utilization of personal judgment in translating tone values into conventional indications by visual analysis of the several small areas of which the original is composed and representing the tones by letters or series or combinations of dots, perforations or other signs.

An object of the present invention stated broadly is to form without the intervention of personal judgment, an intermediate record in the form of a marked tape or band adapted to be employed to control the operation of an automatic telegraphic transmitting machine and to be reproduced by an automatic telegraphic receiving machine.

Preferably, the marked tape is of a character adapted to be produced by or employed in the automatic control of standard telegraphic machines, and ordinarily the tape or band will be marked by punching or perforating means electrically selected and controlled by a representation of the image to be transmitted.

This representation may be formed in any suitable manner, such as by a photographic representation on a plate of conducting material, by a record formed in plastic material, by reflective areas formed on an otherwise nonreflective surface or other suitable means.

A further object of the invention is to provide an improved method of securing the desired gradation, which method may be applicable to other processes of phototelegraphy than that described in the foregoing as well as to other purposes.

This phase of the invention comprises forming a plurality of representations from the original, differing one from the other in that they each correspond to given fractions of the tones or ranges of tone in the original.

Thus one representation may comprise only the deepest tones or full shadows of the original, a second may include only the next lighter tones or both these tones and the full shadows, a third including still lighter tones, and so on.

Four or five of such representations will usually be found sufficient, and by their aid a composite reproduction on a single surface is made at the receiving station in order to provide a final result which shall agree sufficiently for most practical purposes with the gradation in the original.

When employing these representations for the purposes of phototelegraphy they may be transmitted in succession so that a reproduction of each of them is secured at the receiving station and then with the aid of these reproductions as, for instance, by a plurality of printing operations, photographic or otherwise, a composite result comprising the several representations substantially in register may be obtained. This reproduction as above indicated, will have the desired degree of gradation.

This feature of the invention is not limited in utility to the method of phototelegraphy involving the communication from the transmitting to the receiving station of control signals and is perhaps of use in other fields than phototelegraphy and it is not the intention at present to limit the scope of the protection to any particular field.

Instead of transmitting a plurality of partial tone representations which must be superimposed to reproduce the original picture, the intermediate record (preferably a punched tape) may be in effect a composite record of the several partial tone representations of the picture. This composite intermediate record may then be telegraphically transmitted to (i. e. reproduced at) the receiving station and from the transmitted intermediate record a reproduction of the original picture may be made directly.

A still further feature of the invention is based upon the observation that it is unnecessary to advance the light sensitive surface in a stepwise manner in relation to a source of light adapted to operate upon successive areas of the said surface to produce a pictorial representation from an intermediate record. According to this feature of the invention the light sensitive surface and an intermediate record on which in equal lengths of travel the tone values of equal areas are recorded are caused to travel continuously or uninterruptedly.

Other objects of the invention will be obvious from the disclosure itself.

The following particulars are given by way of example to illustrate in detail suitable methods of carrying the invention into effect and the means employed therefor, reference being had to the accompanying drawings, in which:—

Figure 8 illustrates a device which may be employed to reproduce the picture from a punched tape (intermediate record) of the type produced by the perforator shown in Figures 3 to 7, inclusive.

Figure 9:
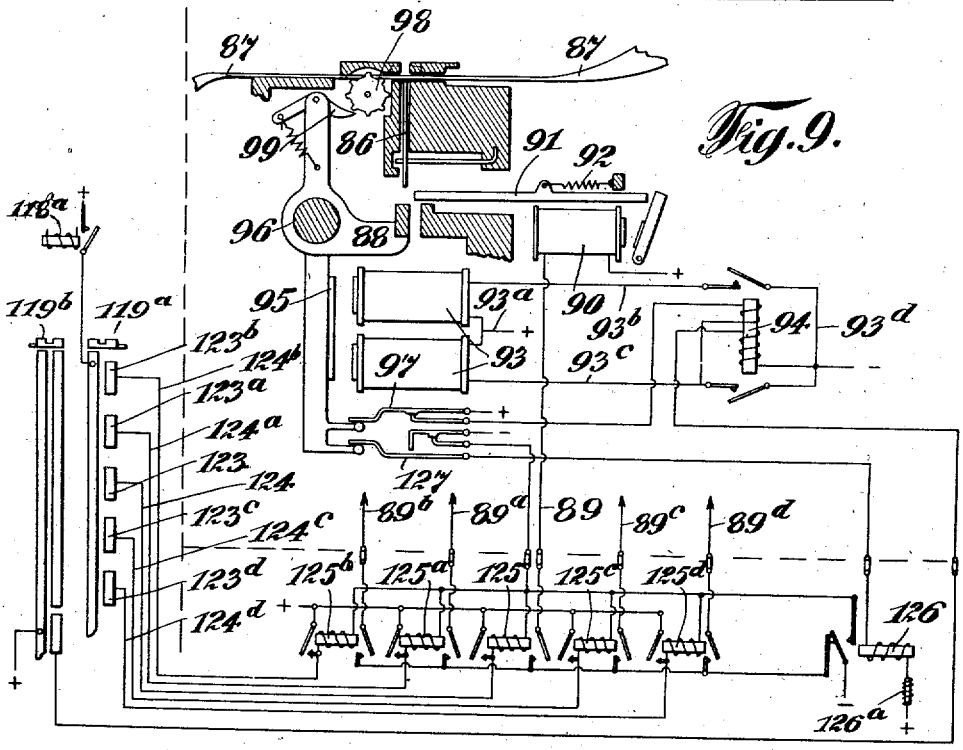

Figure 9 illustrates diagrammatically the machine known as the 6A machine perforator of the Western Electric Company with an accessory device known as the relay box associated therewith. This machine, to which no claim is made herein, is adapted to form a punched tape of the 5 unit code type and may be controlled in accordance with the invention to produce an intermediate record, for instance as described in Examples II and III.

Figure 10 is a view in elevation of an apparatus which may be used to reproduce the picture from a punched tape (intermediate record) of the type produced by the perforator shown in Figure 9.

Figure 11:
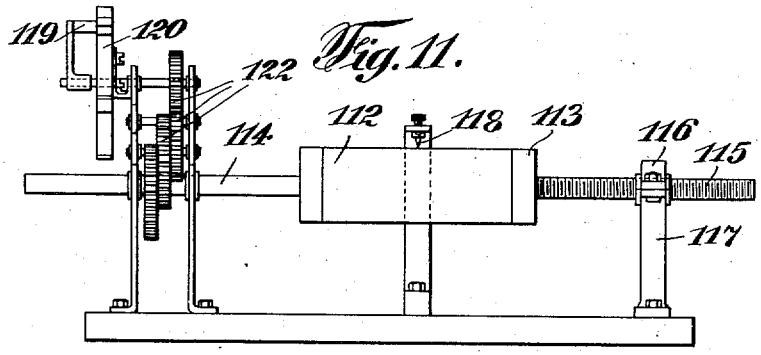

Figure 11 is a front elevation and

Figure 12:
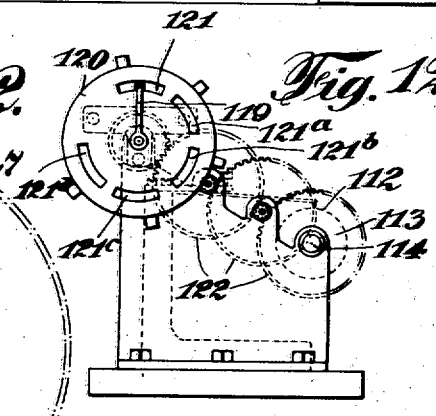
Figure 3:
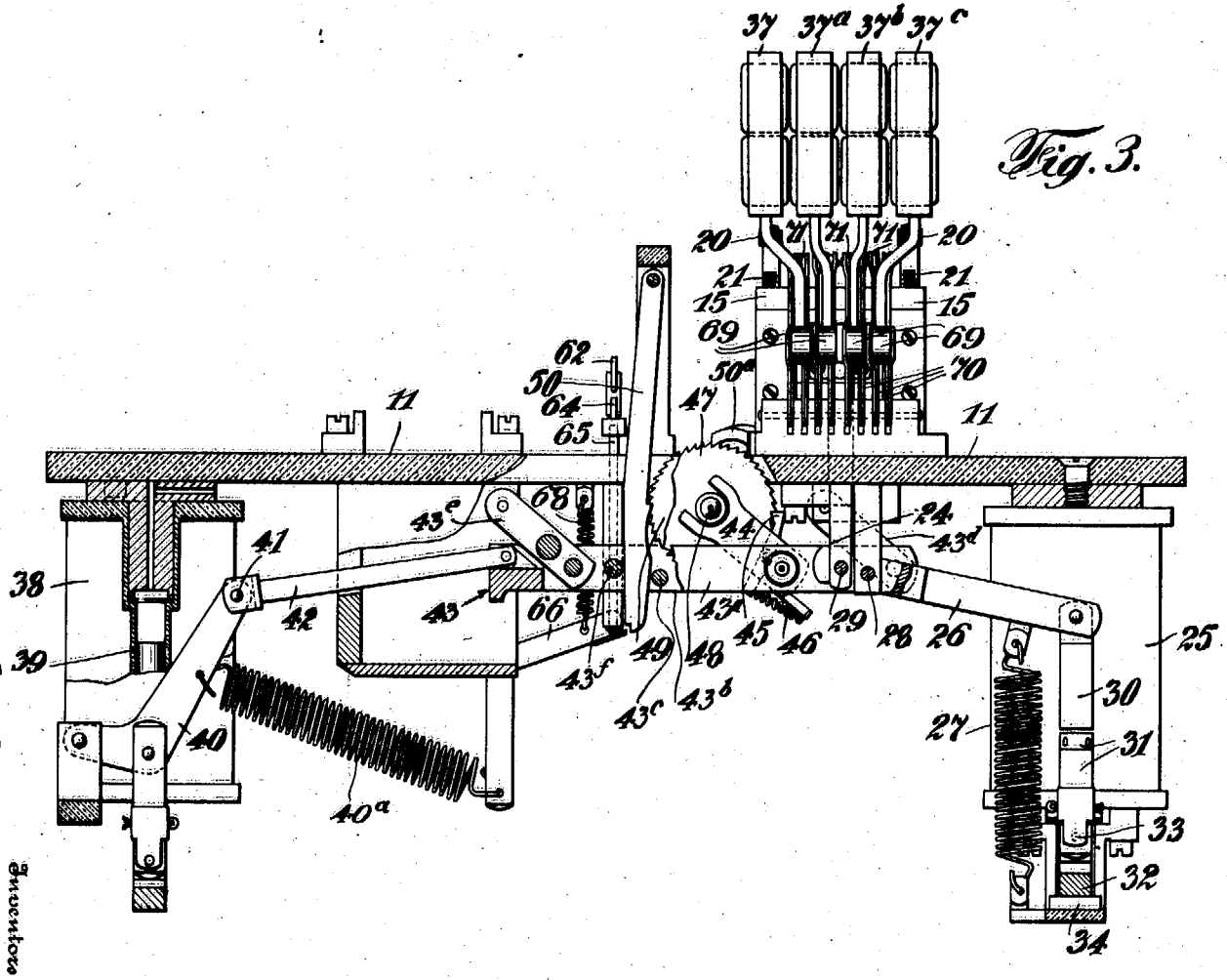
Figure 3 is an elevation partly in section of a perforator adapted to form an intermediate record in the form of a punched tape when its operation is, for instance, controlled by the device illustrated by the preceding figures, and in the manner described in Example I.
Figures 4, 6:
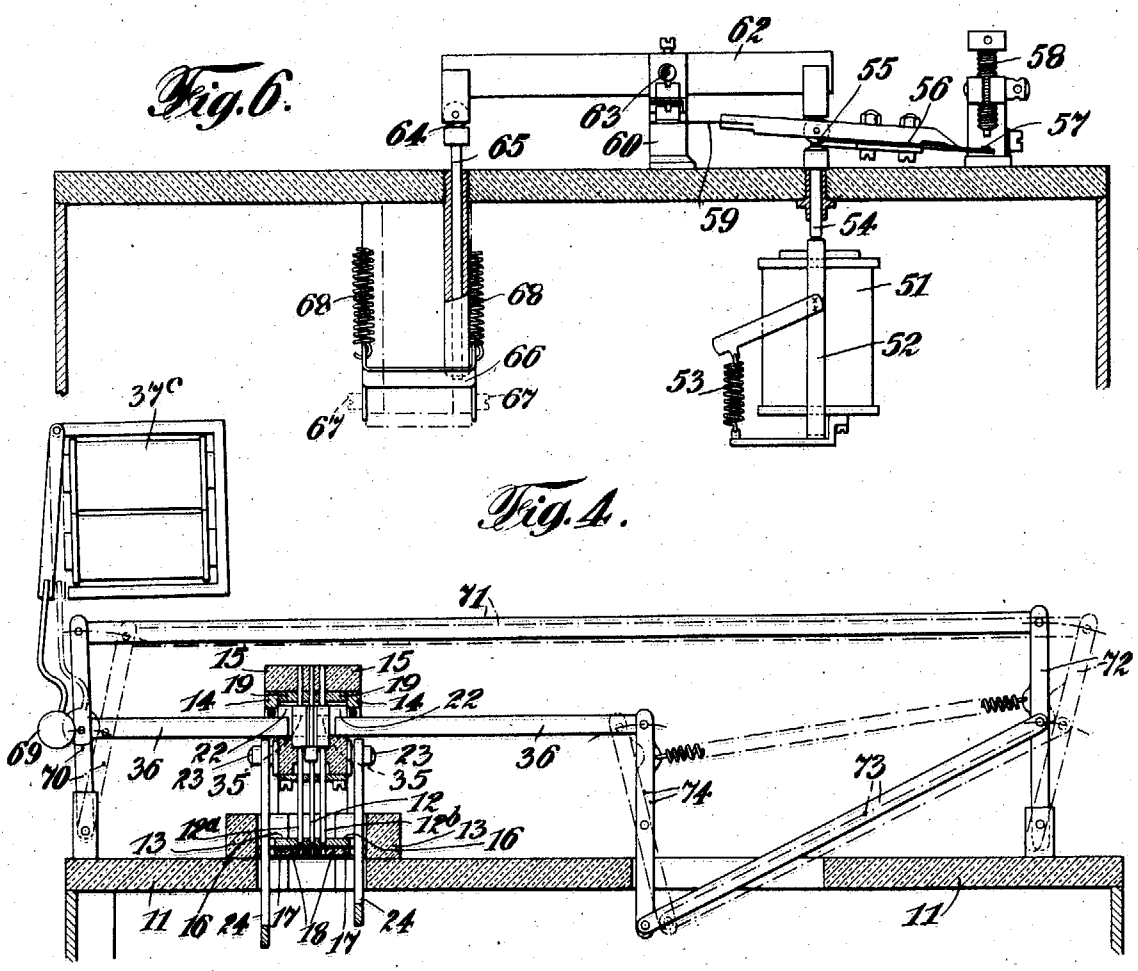
Figure 4 is a view in elevation partly in section in a vertical plane at right angles to the plane of Figure 3, illustrating a portion of this device.
Figure 6 is a view of another detail.

Figure 12 is a side elevation of an apparatus adapted for use in forming an intermediate record from a "half-tone" or like screen representation of the original.

Figure 13:
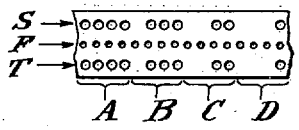

Figure 13 is an illustration of the tape punched by the perforator shown in Figures 3 to 7, inclusive.

Figure 14:
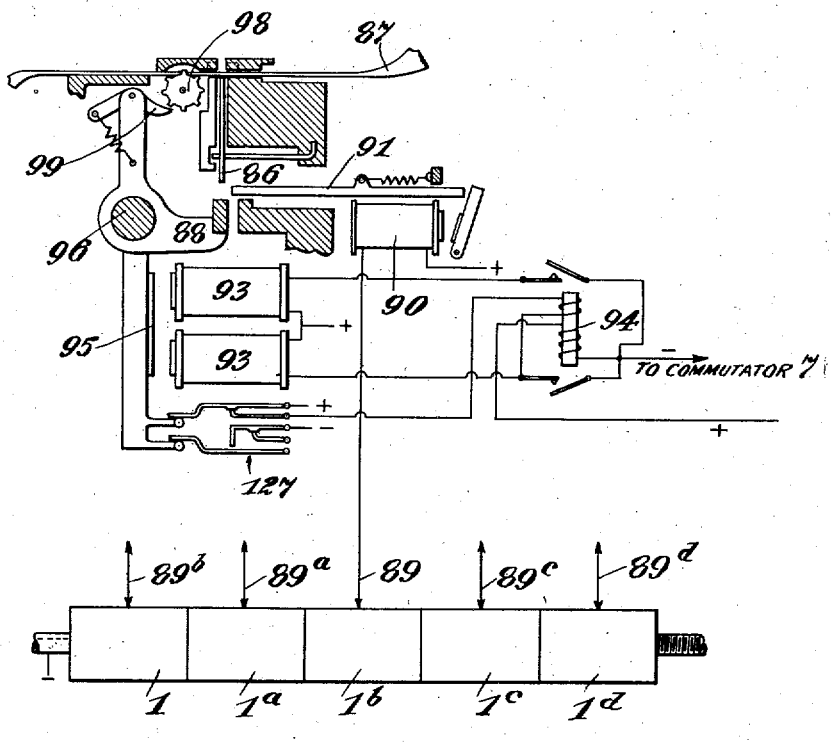

Figure 14 is a schematic diagram of the Western Electric 6A perforator connected for control by a plurality of partial tone representations of the picture to be transmitted.

Figure 15:
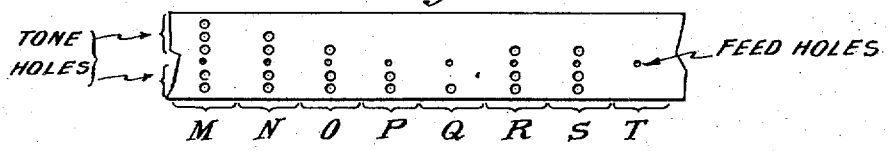

Figure 15 is an illustration of the tape punched by the perforator shown in Figures 9 and 14.

All of the figures of the drawings are more or less diagrammatic.

*Example I*

In this example a plurality of representations (four will be referred to although more may be used) formed from the original, each representation corresponding with a particular range of tones, is employed and an intermediate record is formed on a transmitting tape.

The four representations, 1, $1^a$, $1^b$, and $1^c$ (see Figures 1 and 2) are formed on a thin zinc plate by coating the same with gum and sensitizing in the manner usual in forming gum bichromate prints or in forming a photoprint on a metal plate which is intended to be subjected to an etching process. In the case of a plate that is to be etched, bare metal is exposed where the acid is to act; and where no acid action is to take place, the metal plate is covered with a protective coating. Similarly, each of the representations 1, $1^a$, $1^b$, and $1^c$ has a coating (on the metal) over the area where a particular range of tones is present in the picture. Print 1 may be made by exposing the sensitized zinc plate to a negative of the picture for so short a time that only the full tones of the picture are produced. Print $1^a$ may be exposed for a somewhat longer time so that it will contain the full tones and the stronger partial tones of the original; i. e. print $1^a$ is a silhouette that takes in such portions of the original as have either the full tone or a strong partial tone. Print $1^b$ may be exposed for a still longer time so that it will contain (in silhouette form) all tones except the weaker partial tones. Print $1^c$ may be exposed for a still longer time so this will contain (in silhouette form) the full tones and all of the partial tones.

The developed and dried prints may be baked and they are mounted in correlated relationship on a mandrel 2 secured to a spindle 3, the portion of which extending beyond one end of the mandrel is provided with a lead screw 4 operating in a fixed nut 5 in order to cause the mandrel to travel in an axial direction, the other end of the spindle being mounted in a suitable bearing 6.

In this case the intermediate record is to be formed by perforating a paper tape. The spindle 3 is operatively connected with feeding mechanism for the tape, so that as the spindle rotates, the tape is advanced step by step as the mandrel makes increment after increment of rotation, which rotation need not be step by step. The connection may be mechanical but in the construction illustrated it is electrical, a commutator in the form of a toothed wheel 7 being mounted on the spindle, brush 8 contacting with the same and making a continuous electrical connection with a source of current and a second brush 9 operating on the points of the teeth only and making an electric connection periodically in order to initiate the step by step movement of the tape. The four representations are caused to travel relatively to four styles or reader members 10, $10^a$, $10^b$, $10^c$ resiliently mounted and adapted to make an electrical connection through the metal plate on which the representations are formed with the devices adapted to form on the record-receiving material the marks indicating the combined tone values of the representations.

The perforator, the employment of which in forming the intermediate record will be described, resembles generally a known device, the Gell perforator, from which, however, it differs in that it does not necessarily comprise means for converting letters and numerals into combinations of punched holes and in that it does not, when used for phototelegraphy ordinarily vary the feed of the tape according to the number or arrangement of marking holes formed therein.

With regard to this portion of the device we may say that we have employed the construction described mainly because the several parts thereof were available to us and were readily adapted for the purpose in view.

Figure 7:
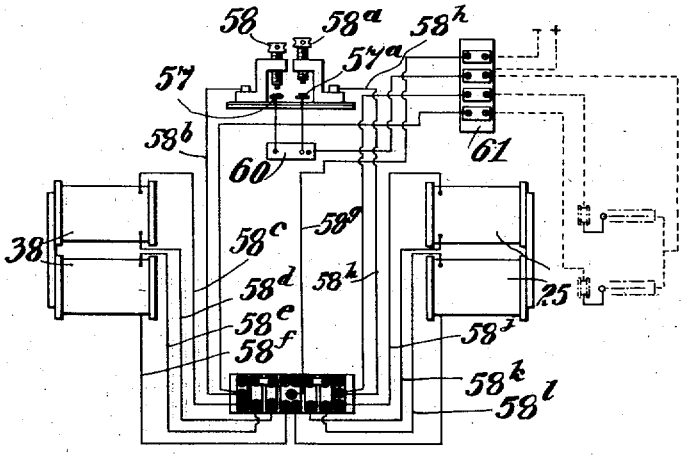
Figure 7 is a diagram illustrating the electrical connections of the apparatus.
Figure 5:
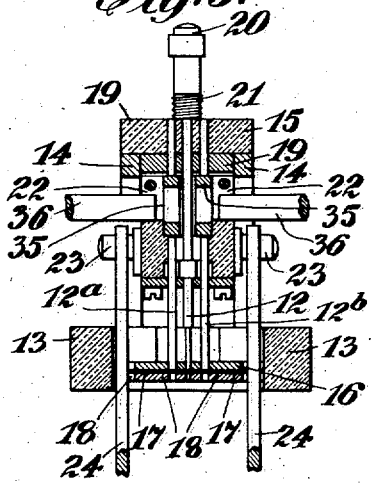
Figure 5 is a detail thereof.

The device (see Figures 3 to 7) comprises a casing 11 enclosing a portion of the mechanism, the top of the casing serving as a platform or support for numerous elements including three banks of punches 12, $12^a$ and $12^b$. Each bank contains four punches. The punches of bank 12 are carried by the slider 22 and all of these punches 12 are operated each time the slider descends. The punches of banks $12^a$ and $12^b$ are adapted to be selectively locked to slider 22 (in response to electrical connections made by styles 10, $10^a$, $10^b$, and $10^c$) and when the slider 22 descends such of the punches in banks $12^a$ and $12^b$ as have been selected will be operated. Bank 12 punches a longitudinal row of feed holes in the tape. Bank $12^a$ punches longitudinally disposed groups of holes which indicate the tone values read by styles 10, $10^a$, $10^b$ and $10^c$. Bank $12^b$ punches a third longitudinally disposed row of holes which is merely necessary to enable the tape to be employed in the operation of a Wheatstone transmitter, and to enable a corresponding tape to be produced at the receiving station by a Creed or other suitable reperforator. The punches are provided with a punch base 13, side guides 14, top plate 15 and bottom guide plate 16, a distance piece 17 introduced between the bottom guide plate and the cutting die 18; a check stop plate 19 is provided to limit the upward travel of the punches by limitation of the upward motion of the slider 22 secured by trunnions 23 to the pitmen 24 which are drawn down under the action of the pair of perforating solenoids 25 within which cores are arranged to move the perforating lever 26 in opposition to the spring 27 about the pivot 28 whereby the pitmen secured to the lever through pins 29 are operated, the lever being connected by the connecting rod 30 provided with adjusting members 31 with the yoke 32 connecting the cores through the intermediary of pins 33, a rubber cushion 34 being provided for taking up shocks for the reduction of which spiral springs are also provided. As shown in Figure 7, there are two perforating solenoids 25 operating together as a unit and arranged in a manner similar to tape advancing solenoids 38 (Figs. 3 and 7) which will be described later. As indicated by the section lining of yoke 32 in Figure 3, this portion of the view is a section taken between the two solenoids 25.

Each marking punch is provided with a slot 35 and is free in the slider except when engaged by the associated interlocking bar 36 and will only be moved as the result of the motion of the slider when so engaged.

The interlocking bars, of which it has been found convenient to utilize eight when the pictoral representation is divided into four components, are operated by four electromagnets 37, $37^a$, $37^b$, $37^c$, two bars by each electromagnet which is energized by the passage of current through the metal on which the representation is formed and the associated style and conductors. Thus, when in all four components of the representation bare metal contacts with the four styles, all four electromagnets will be energized and all of the eight punches will be locked to the slider and will move down with it under the action of the perforating solenoids.

The feeding solenoid 38 operates upon a core 39 which is connected through the bell-crank lever 40 and the pin 41 and connecting arm 42 with the oscillating arm designated as a whole by numeral 43. As viewed in Figure 3, this oscillating arm 43 is located behind lever 26; and it comprises two laterally spaced bar-like portions $43^a$ and $43^b$. Extending between the spaced bar-like portions are swinging links $43^c$ and $43^d$, to which the oscillating arm is pivoted. The oscillating arm operates the active radial arm 44 with which is associated the active click 45 and active click spring 46 and in the motion of the oscillating arm to the left under the action of the solenoid the active click moves idly over the ratchet wheel 47 mounted on the main feed shaft 48 on which also is mounted the tape feed sprocket (not shown) provided with teeth engaging the holes formed in the tape by the central bank of punches. Return motion of the oscillating arm to the right feeds the tape forward, a check ratchet wheel 49 associated with a check ratchet 50 operating to prevent overrunning. When the oscillating arm moves to the left pin $43^e$ withdraws ratchet 50 from engagement with wheel 49, and when the arm 43 moves to the right pin $43^f$ restores the ratchet 50 upon completion of the feed of the tape. The control of ratchet 50 will be more fully described later. The movement of the oscillating arm to the left is effected by the action of the feeding solenoid and is limited to secure a constant throw or feed of the tape, the spring $40^a$ retracting the oscillating arm to the right and moving the feed wheel as permitted by the spring controlled pawl $50^a$.

The commutator 7 described operates to intermittently energize a solenoid 51 the core of which is connected to the yoke 52 which is drawn up in opposition to the spring 53 and operates through the rod 54 and insulating roller 55 the key 56 to cause the contacts 57, $57^a$ thereon to make contact in succession with the contact screws 58, $58^a$, thereby completing, see Fig. 7, first the circuit through the feed solenoid 38 by way of $58^b$, $58^c$, $58^d$, $58^e$, $58^f$, $58^g$ and then through the perforating solenoid 25 by way of $58^h$, $58^j$, $58^k$, $58^l$, $58^g$, thus operating the perforating punches. The key is connected by flexible connections 59 with the block 60 which, as illustrated in Figure 7, is in electrical connection with the set of terminals 61. One end of the lever 62 pivoted at 63 bears on the roller associated with the key, the other end bearing through the roller 64 on the head of the rod 65. On motion of the lever about its pivot under the action of the solenoid associated therewith, the rod will be moved in a vertical direction and when moved downwards it will cause the member 66 to move about the pivot 67 in opposition to the springs 68, thus releasing the check ratchet 50 (see Fig. 3). When on the other hand the member in question is retracted by the springs it will lock the check ratchet in position on completion of the travel of the oscillating bar to the right.

The perforating solenoid operates the marking punches which have been selected by the operation of the electromagnets connected to the styles. The selection of the punches is effected by the inward motion of the hammers 69 bearing upon the levers 70 connected by rods 71 to the levers 72. These levers in turn are connected through rods 73 and levers 74 with the selector bars 36 operating in association with the opposite marking punches.

The operation of the hammers and thus the selection of the punches results from the completion of the electric circuits in which are arranged their associated electromagnets in the manner above described.

As indicated in Fig. 7, contact is first made at 58. This causes the oscillating arm 43 (Fig. 3) to move to the left in an idle movement and stay to the left until contact at 58 is broken. Following contact at 58, contact is made at $58^a$ and this causes the operation of the punches. Then contact at $58^a$ is broken, thus deenergizing punching solenoids 25 and permitting spring 27 to restore the punches. Following this, contact at 58 is broken, thus deenergizing solenoids 38 and permitting spring $40^a$ to return oscillating bar 43 to the right and feed the tape.

The tape produced in this manner is illustrated in Figure 13. The zones or sections A, B, C, and D are the result of four successive punching operations. The center bank of punches punches a longitudinal row of feed holes F, all four punches being operated at each punching operation. The bank of punches $12^a$ (Fig. 5) punches a row of marking or tone holes T. The bank of punches $12^b$ punch a row of holes S known as spacing holes. The spacing holes are duplicates of the tone holes and only row T need be considered, because as previously stated row S is merely for the purpose of enabling the tape to be used in a Wheatstone transmitter or the like. At each punching operation, a number of holes is punched in row T equal to the "number" of the tone value present at that reading of the picture representations 1, $1^a$, $1^b$, and $1^c$, the tones being considered as "no tone", "tone number one", "tone number two", "tone number three", and "tone number four". In Fig. 13, the tone value (or tone number) at reading A was "four" and there are four holes in row T. The tone at reading B was "three" and there are three holes in row T, etc.

The transmitting tape produced in this manner is then employed for controlling a transmitter at one end of a telegraph or telephone circuit thereby operating a receiving mechanism in order to reproduce the representation.

The transmitting tape may, for instance, be used in controlling a transmitter and operating a reperforator of the Creed or other suitable type at the receiving station in order to produce a corresponding tape, such tape being then used in forming a visual representation of the original, as for instance by moving a light sensitive surface in a continuous manner in relation to means whereby successive small areas of the same may be exposed to the action of light, the exposure of said areas being varied in respect of duration or intensity of light action, by means of the tape. This may be effected by the employment of apparatus of the character indicated in the specification of British Letters Patent No. 166,917 of 1920.

Alternatively, the tape may be employed in controlling an apparatus in which the tape and light sensitive surface are moved continuously.

The apparatus may for instance comprise (see Figure 8) a cylindrical mandrel 75 about which the light sensitive surface is wrapped, the mandrel being arranged under a cover 76 in relation to a projector 77 adapted to project a spot of light onto the light sensitive surface in such manner that the spot of light will trace a helical path on the said surface, and means 78 adapted to cause the tape 79 to travel at a speed bearing an appropriate relation with the speed of travel of the light sensitive surface in relation to the means adapted to illuminate the same, and control the exposure thereof.

The tape, to this end, is caused to travel between guides 80 over an aperture 81 in the platform 82, being pressed against the same by the block 83 which is also perforated to permit a beam of light from the lamp 84 passing through the lens system 85 to fall upon the tape in such manner that the marking holes in the tape, of which only one row need be employed for this purpose, will permit the light to pass through the projector on to the light sensitive surface while the portion of the tape intervening between adjacent holes will intercept the light.

Presuming that a result comparable with that obtained by a 50 line screen is to be produced and the circumference of the light sensitive surface supported on the mandrel is four inches, the tape should be moved at such a speed that approximately one section will control the exposure of 1/50th of a linear inch of the circumference. In other words the mandrel will make 1/200th or preferably 2/401sts of a turn, while one section of the tape is passing, the speed of travel of the tape relatively to the speed of rotation of the mandrel in making the record being similarly regulated to secure an advance of the latter of 1/200th but preferably 2/401sts of a turn for each section of tape.

In other words, if the representations 1, $1^a$, $1^b$, and $1^c$ (from which the tape is made) make 1/200th of a turn for each zone A, B, C, etc. of the tape (Fig. 13), the reproducing mandrel 75 (Fig. 8) must also make 1/200th of a turn for each zone A, B, C, etc. of the duplicate tape produced at the receiving end of a telegraph line. Preferably, however, the representations 1, $1^a$, $1^b$, $1^c$ are made to turn 2/401sts of a turn for each zone A, B, C, etc. of the tape, and in such case the reproducing mandrel 75 must also make 2/401sts of a turn for each zone A, B, C, etc., of the tape. This preferred rate of rotation has the advantage that the centers of the elemental areas of one line of scanning are positioned midway between the centers of the elemental areas of the lines of scanning on either side of it, which gives the reproduced picture a better appearance. Where the mandrel makes 1/200th of a turn for each zone of the tape, the elemental areas of the picture are thereby so selected that their centers are arranged in the pattern of the intersecting points of the lines of a piece of coordinate paper. This has the disadvantage that the coordinate arrangement is apparent to the eye when the picture is viewed. On the other hand where the mandrel makes 2/401sts of a turn for each zone of the tape, the elemental areas of adjacent rows of scanning are staggered, and the geometrical arrangement of elemental areas is not so apparent to the eye.

That this staggered arrangement is produced, will be apparent if we consider a case where the first reading of the first turn is taken at a distance of 2/401sts of a turn from the edge of the picture. Then successive readings will be taken at distances of 4/401sts, 6/401sts, 8/401sts, 10/401sts, etc., from the edge of the picture. The 200th reading will then be at 400/401sts of a turn from the initial edge of the picture and the 201st reading will be at 402/401sts of a turn which is equal to 1/401sts of a turn in the second turn. Hence the readings of the second turn will be at 1/401sts, 3/401sts, 5/401sts, 7/401sts, 9/401sts, etc., of a turn in the second turn which places the elemental areas midway between those read in the first turn. The picture is, of course, reproduced in like manner and hence the reproduced picture has the elemental areas of each turn staggered with respect to the elemental areas of the turns on either side of it.

*Example II*

In accordance with this mode of carrying the invention into effect a tape, each unit of which consists of holes arranged transversely to the direction of travel of the tape, and in this respect resembling a tape punched on the five unit code, is used in making the record.

The plurality of representations are operated on by styles which are arranged to make connection through the mandrel, as in the preceding example, with means adapted to select appropriate punches.

The perforator illustrated diagrammatically in Figures 9 and 14 resembles generally the $6^A$ machine perforator of the Western Electric Company and it is to be understood that no claim is made to this construction except in so far as it may be modified for use in the process of telautography or phototelegraphy according to the invention. In this example, reference will be had primarily to Figure 14, though the machine perforator is the same both in Figure 14 and Figure 9.

The perforator comprises six punches, of which one 86 is seen in the figure, arranged at right angles to the direction of travel of the tape 87, one punch, not shown, being longer than the others and being operated upon by the hammer 88 at each stroke to form feed holes, and such of the other punches as have been selected being simultaneously operated by the same hammer to form marking or tone holes.

The styles read a plurality of partial tone representations similar to those described in connection with Figure 1. Five representations of the picture 1, $1^a$, $1^b$, $1^c$, and $1^d$ are operated on by styles connected to conductors $89^b$, $89^a$, 89, $89^c$, and $89^d$. Each of these conductors is connected to an individual punch selecting magnet so that a punch is selected when bare metal of the particular partial tone picture representation contacts with its style. Whenever any portion of the picture representing coating is under the style, the style is insulated from the zinc plate and hence no current can flow to select a punch. These punch selecting magnets are all arranged alike and hence only one is shown (which is for representation $1^b$).

When bare metal of $1^b$ contacts with its style, selecting magnet 90 is energized, thus interposing selector bar 91 between hammer 88 and punch 86. As explained in the preceding example, a commutator 7 operates to periodically cause the operation of the selected punches. This commutator periodically energizes relay 94 which is locked up by a circuit through its bottom contact and the upper contact of key 127. The operation of relay 94, energizes punching magnets 93, thereby attracting armature 95, and causing hammer 88 to drive the selected picture punches (and the feed punch previously referred to) through the tape. As the hammer completes its stroke, key 127 is operated and breaks the lock-up circuit of relay 94. Thus punch magnets 93 are deenergized and the hammer returns to its non-operated position. On the return stroke pawl 99 rotates feed wheel 98 to advance the tape preparatory to the next punching operation.

In this example, the picture representations are operated on by the styles along successive lines of scanning, just as in Example I. Reading of the successive elemental areas along the lines of scanning are taken just as in Example I, but instead of being recorded on the tape by longitudinally disposed rows of tone holes, they are recorded by transversely extending rows of tone holes punched in the five unit code. It is obvious that the elemental areas in one line of scanning may be so selected (as explained in Example I) that they will lie intermediate the elemental areas in the adjacent lines of scanning, and thereby improve the appearance of the reproduced picture as previously explained.

The tape formed in this way may operate a transmitting device, and a device at the receiving end may form a similar tape which is then employed in controlling a device adapted to form a visual reproduction of the original. This device may generally resemble the device employed for the like purpose according to Example I, being, however, provided with a plurality of illuminating devices 100, $100^a$, $100^b$, $100^c$ and $100^d$ (see Figure 10) the light from each of which is directed by means of the lens system 101, $101^a$, $101^b$, $101^c$, $101^d$, and is controlled by a marking hole arranged at a particular distance from the edge of the tape and the rays permitted to pass by all of the holes are concentrated or directed to form a single spot of light on the light sensitive surface.

This spot will be formed by rays of light from four sources, if there are four marking holes in a line at right angles to the direction of travel of the tape, or from three, two or one sources if there are three, two or one holes the light being completely cut off if there is no marking holes in the tape corresponding with a feed hole, and will be projected on to the light sensitive surface 102 wrapped about the mandrel 103 mounted on a spindle 104, one end of which is formed as a lead screw 105 operating in the nut 106 adapted to cause the mandrel to travel axially as well as radially, the spindle operating through suitable gearing 107, the tape feed sprocket 108 causing the same to travel over the platform or diaphragm 109 in which a slot is formed with which the holes in the tape will register and permit light to pass through to the projecting lenses mounted in the tube 110 and on to the light sensitive surface which is mounted in the light-tight cover 111.

*Example III*

According to this example, a half tone or line screen reproduction 112 formed of conductive material is mounted on a mandrel 113 secured to a spindle 114, one end of which is formed as a lead screw 115 and operates on a nut 116, formed on the standard 117, is operated upon by a single style or reader-member 118 (see Figures 11 and 12) the reproduction being moved relatively to the style through the intermediary of the means referred to.

The surface of this reproduction is of course composed of upstanding dots of various sizes according to the depth of tone represented.

The style or reader member is connected to a brush 119 which moves over a commutator 120 comprising as many contact pieces 121, $121^a$, $121^b$, $121^c$, $121^d$ as the total number of tones required to be represented.

If five punches are employed for forming the holes corresponding with the deepest tone there will be five contact pieces on the commutator, each of which with one intervening nonconducting portion will be of such length as to occupy 60° of the face of the commutator or some other fraction depending on the method used in the production of the half tone original and on the ratio of the sizes of the dots to the tones in the original picture (this ratio being in the nature of $n \times \frac{b-a}{5}$ when $b$ is the size of the largest dot, and $a$ of the smallest dot, and $n$ is a constant to be determined by the method used in the preparation of the half tone dependent on the speed of the plate and the duration and intensity of the exposure). There will also be a non-conducting portion of the commutator of proportionate length between one pair of contact pieces.

In other words, the commutator is divided into six sectors, the size of each sector being determined by the nature of the half tone. Five successive sectors each contain a conducting segment (which is insulated from the other segments) and the sixth sector is blank. The brush makes one complete revolution while the style is passing over one elemental area of the half tone, viz., the distance between two consecutive screen lines of the half tone. While the brush is in contact with any one segment, a circuit is made through that segment to select a corresponding punch of the perforator provided the style 118 is then contacting with the half tone dot. If the size or shape of the dot be such that there is no style contact for that particular segment, no selection of a punch will be made for that segment. Thus as the style 118 passes over one elemental area of the half tone, it (in effect) takes five readings, one at each of five points in that elemental area, viz., one reading at each commutator segment. If the style contacts with the half tone dot at a reading, a corresponding punch is selected. If the style does not contact with the half tone, no punch is selected for that reading. After all five readings have been made on an elemental area of the half tone, the selected punches are operated while the brush is on the sixth sector, which is blank.

Suitable punches and selecting mechanism are employed, and these may conveniently be of the type used in the Western Electric 6A perforator. The connections in such case are shown in Fig. 9. The style 118 is connected to energize relay 118a at such times as it is in contact with a half tone dot. Thus as brush 119a makes contact with five successive commutator segments 123b, 123a, 123, 123c, and 123d it makes them positive provided the style 118 is in contact with the half tone dot. Whenever the style is out of contact with the dot while the brush is passing over a segment, that segment is not energized.

Each of the five segments is connected through a lock up relay to a selecting magnet. These circuits from the segments 123b, 123a, 123, 123c, and 123d are all alike and hence only one will be described in detail.

Consider that the style is in contact with the half tone dot when the brush 119a is on segment 123. Then a circuit is completed from this segment (which is positive) through conductor 124, relay 125 and switching key 127 to negative, thus operating relay 125. Relay 125 locks up through its left hand contact; and through its right hand contact it energizes selector magnet 90. This places the end of selector bar 91 between punch 86 and hammer 88 so that operation of the hammer will actuate the punch 86 which has been selected.

There are six punches in a row extending transversely to tape 87 and since they are all similar, only one is shown. Five of the punches are individually under the control of individual selector bars and magnets, all of which are similar to magnet 90. The circuits to the magnets not shown are through conductors 89b, 89a, 89c, and 89d. The sixth punch is longer than the rest and is operated at every stroke of the hammer to punch a feed hole in the tape.

Segments 123b, 123a, 123c, and 123d are connected through conductors 124b, 124a, 124c and 124d, respectively to relays 125b, 125a, 125c and 125d, respectively. Accordingly, as brush 119a sweeps over its five segments, punches will be selected in accordance with the readings of the style 118 on the particular half tone dot. When the brush 119a passes to its blank sector, brush 119b completes a circuit through conductor 119c to relay 94. Thus relay 94 is operated and it is locked up by a circuit from negative through its lower contact and a lock up winding to switching key 97 and positive. Through conductor 93d, relay 94 causes the energization of punch magnets 93 which are connected to positive through conductor 93a. Accordingly, the hammer 88 is rotated on shaft 96 and the selected picture punches (and the feed hole punch) are driven through the tape.

Switching key 127 is mechanically associated with the hammer, to be operated as the armature 95 approaches the punch magnets 93. The upper contact of the key 127 breaks the lock-up circuit of relay 94 to permit the deenergization of punch magnets 93 and the return of the hammer to its non-operated position. The lower contact of key 127 makes the circuit to relay 126, and the center contact of key 127 breaks the lock-up circuits of relays 125b, 125a, 125, 125c, and 125d. Relay 126 is made slow operating in any suitable manner as by retardation coil 126a, so that the circuit at its front contact is not made until after the lock-up relays 125b, 125a, 125, 125c and 125d have released and through their right hand contacts broken the circuits to the selector magnets, e. g. selector magnet 90. Then contact is made by the front contact of relay 126 to place negative on the winds of relays 125b, 125a, 125, 125c and 125d, thus placing these relays in condition to record the readings of the style 118 on the next elemental area of the half tone.

As key 127 is returned to the position shown in the drawing connection to negative is restored through the center contact of the key and relay 126 returns to its non-operated position.

*Tape punched in Examples II and III*

The tape punched by the apparatus of Figs. 9 and 14 is illustrated in Fig. 15. For the sake of clarity, the successive transverse lines of punching are shown farther apart than they ordinarily would be in actual practice. The punchings for eight successive elemental areas of the picture are shown in tape zones M, N, O, P, Q, R, S and T. Each tape zone has a feed hole, and a number of picture holes which represents the tone number or tone value of the elemental picture area represented. The tones are: zone M, tone "five"; zone N, tone "four"; zone O, tone "three"; zone P, tone "two"; zone Q, tone "one"; zone R, tone "three"; zone S, tone "three"; zone T, no tone.

*Definition of terms*

In effect, the picture to be transmitted is scanned along a large number of lines of scanning, and each line of scanning is divided into a multiplicity of elemental areas. The elemental areas are so small that for practical purposes, any one area can be considered as having a constant tone value. The tone values of the elemental areas are individually determined and are marked upon a tape. For convenience, the tape may be considered as made up of zones, and it may be marked in such manner that any one tape zone may correspond to a particular elemental area of the picture and be marked with the tone value of that elemental area.

For convenience, a tape zone which corresponds to an elemental area of the picture is called a "picture zone"; and the markings which depict the tone values are called "tone markings". A tone marking may be a cut out area (e. g. the total area of one or more perforations) and as such it is called a "cut out tone area". Specifically, tone markings in the form of perforations are called "tone perforations" or "tone holes".

Referring to Figs. 13 and 15, it is seen that the picture zones of the tape (designated by capital letters) follow one one another as the tape is traversed in a longitudinal direction. Accordingly, the picture zones may be said to be arranged "longitudinally of the tape," by which is meant that as we travel longitudinally of the tape we pass from one picture zone to another, either with or without passing through tape zones which are not "picture zones." The expression "zones arranged longitudinally of the tape" has no reference to the dimensions of the zone, i. e. no reference to the dimension of the zone longitudinally of the tape and the dimension transversely of the tape.

In Fig. 15, each picture zone is adapted to receive a set of tone perforations (maximum number of perforations, in a "set" is five, e. g. zone M) arranged in a row transversely of the tape. The actual number of perforations in any one picture zone depends upon the tone value of the elemental picture area represented by that zone. In general, however, the tape is characterized by a series of picture zones, each of which has a transversely extending row of tone perforations. For convenience, therefore, the tape will be referred to as having "rows of tone perforations", although in some instances a picture zone may have only one tone perforation (e. g. zone Q) or even no tone perforation (e. g. zone T). Expressions such as "set of tone perforations" are used in an analogous sense (i. e. analogous to "row of tone perforations"), but are broader expressions which include cases where the tone perforations for a single elemental area of the picture are not arranged in a "row". In other words, a "set" of tone perforations is one or more tone perforations which taken collectively depict the tone value of an elemental area, with no limitation as to the relative position of the perforations which go to make up the set.

The invention may be used for transmitting black and white pictures, e. g. ink drawings, silhouettes, manuscripts, etc. Its greatest usefulness, however, is probably in the analysis and transmission of pictures such as photographs of objects, persons, scenes, etc. The problem of transmitting such picture is much greater than the transmission of black and white pictures because of the constantly varying tone values possessed by the picture. Such pictures have "actual tone gradations" as opposed to black and white pictures which have no actual tone gradations. In the black and white picture, any one point is either black or it is white; there are no "actual tone gradations". Black and white pictures may have tone gradations (i. e. in appearance) produced by closely arranged black areas of small size, e. g. shading in a pen and ink drawing and the well known half tone prints familiar in newspapers. Such pictures are said to have "apparent tone gradations", or an elemental area of such a picture may be said to have an "apparent tone value" that lies between black and white, but obviously any one point on the picture is either black or white, but not an intermediate tone.

The picture may be scanned in many ways and by many types of apparatus. Accordingly, reference broadly to scanning the picture is not to be construed to be limited to any particular method or means of scanning the picture, but includes operating upon the picture itself or any suitable representation of the picture such as (inter alia) a positive, negative, transparency, half tone plate, gum bichromate print, relief representation, or a plurality of any such representations. Where a plurality of representations of the picture are used, one representation will ordinarily include only such portions of the picture as have a certain range of tones, another representation include only such portions as have different range of tones and so on. Expressions such as "range of tones" or "tones of a different range" mean that the limits of the tone ranges being compared are different, without regard to whether the tone ranges do or do not overlap. For example, if five representations of the picture have the tones so grouped that the first representation has tone number one; the second representation has tones one and two; the third representation has tones one, two and three; the fourth representation has tones one, two, three and four; and the fifth representation has all five tones; the representations are said to have "tones of different range". Also if the first representation had tone one only, the second representation had tone two only, the third representation had tone three only, the fourth representation had tone four only, and the fifth representation had tone five only, the representations would have "tones of a different range".

Figure 1:
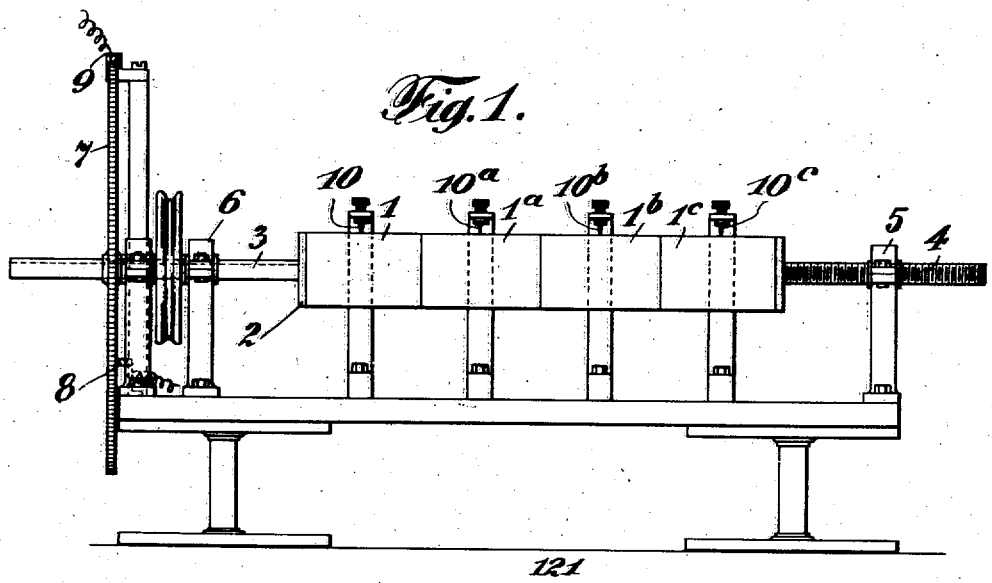
Figure 1 is a front elevation.
Figure 2:
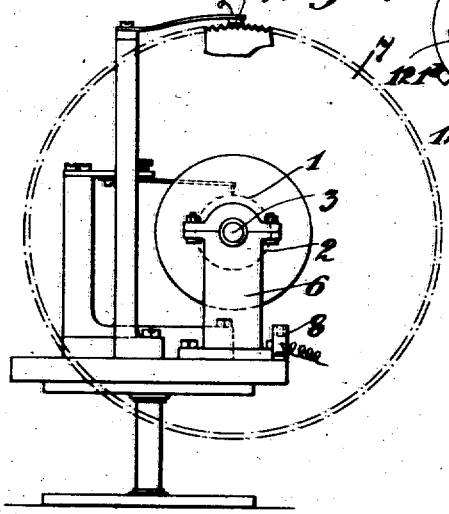
Figure 2 is a side elevation of a device adapted to operate on a plurality of partial tone representations of a single picture in forming an intermediate record as described in Example 1.

Referring to Fig. 1 (by way of example) it is convenient to consider the styles as "reading" the representations, and to consider the styles and their associated circuits as "determining" the tone of each elemental area, the determination being made evident or effective by the energization of the circuits of one or more styles. Accordingly, such references as "determining tone gradations", or "determining tone values", mean that the tone value is made effective in some manner characteristic of the particular tone value. Whether or not an operator has the tone value impressed on his mind is immaterial.

The scanning is carried on line after line until the entire picture has been scanned. A picture may include more than it is desired to transmit, e. g. it may be desired to transmit only one building out of a picture of a group of buildings. In such case, the one building becomes the entire picture as far as transmission is concerned. Accordingly, such reference as "scanning the entire picture" means scanning all that it is desired to transmit.

It is to be understood that the various specific embodiments described are not to be regarded as delimiting the scope of the invention but as illustrative only. For instance the word "picture" is used to designate either an actual picture of a suitable nature or a reproduction or plurality of reproductions thereof as described in the foregoing specification and also includes written or printed messages. The scope of the invention is clearly defined by the appended claims.

We claim—

1. In an apparatus for transmitting a representation such as a picture or the like, a support for said representation of electrically conductive material, reader means adapted to travel over the surface of said representation, means adapted to move said representation and reader means respectively to each other, a source of electric current connected to said support and to said reader means, automatic recording mechanism comprising a plurality of marking means adapted to form an intermediate record which is not a visual equivalent of said representation, the number of said marking means brought into operation at each marking movement being dependent upon the current flowing from said source as determined by the association of the support for the representation and the reader means.

2. In an apparatus for transmitting a representation such as a picture or the like, as claimed in claim 1, feeding means acting to move the material on which the intermediate record is formed past the plurality of marking means, said feeding means acting to advance the tape in an intermittent manner.

3. An apparatus for transmitting a representation such as a picture or the like, having a support adapted to hold a representation, reader means, automatic record forming mechanism associated with the said reader means, and means to produce relative movement between the said support and the said reader means, in which the said record forming mechanism comprises perforating mechanism which includes a number of separately operable punches adapted to perforate a record tape, the association of said reader means with each of a plurality of small areas of the representation to be transmitted being adapted to cause the selection of the punches which are to operate upon said tape, and means for intermittently moving said tape past said punches.

4. In an apparatus for transmitting a representation such as a picture or the like, a support adapted to carry the said representation, reader means associated with the said support and adapted to be associated with the picture or the like carried on the said support, and aiding in rendering the tone values of said picture, means adapted to produce a relative movement between the said support and the said reader means whereby the said reader means are caused to move over the consecutive small areas of a picture carried on the said support, automatic perforating mechanism comprising a series of individually operable punches adapted to perforate a record tape, feeding means adapted to feed said tape with a continuous step by step movement past said punches and independent of the operation thereof and control means for said punches associated with the said reader means and operable according to the tone value of the small area of said picture in association with the said reader means, the said control means being adapted to control the selection of the said punches which are operative on the successive zones of the said tape.

5. A device according to claim 3 comprising a support adapted to carry a plurality of representations of a picture or the like, each said representation corresponding to a predetermined depth of tone of each said picture, and in a separate reader means associated with each representation.

6. An apparatus according to claim 3 comprising a support adapted to carry a series of representations of a picture or the like formed on electric conductive material, each said representation corresponding to a predetermined depth of tone of said picture or the like, and separate reader means associated with each representation.

7. Apparatus for use in photo-telegraphy comprising a half tone screen representation of electrically conductive material, the surface of which is composed of conductive dots of sizes varying with the depth of tone represented, a spindle around which said representation is mounted, means for rotating said spindle and simultaneously feeding same longitudinally, reader means adjusted to contact with the tops of said raised dots, perforator means comprising a number of punches connected with the segments of a commutator, a commutator brush connected to said reader means and serving to complete an electrical circuit during the passage of the reader across a dot and thus to cause the operation of said punches, the number brought into operation depending upon the size of said dot.

8. Apparatus for use in photo-telegraphy comprising a half tone representation the surface of which is composed of raised dots, reader means adapted to contact with the tops of said raised dots, means for causing said means to travel over the surface of said representation, perforator means comprising a number of punches, and a strip of material moved relatively to said perforator means, said reader means operating according to the tone value of successive small areas of the representation to select a larger or smaller number of punches to operate upon said strip.

9. Apparatus for use in photo-telegraphy comprising a spindle adapted to be rotated and simultaneously fed longitudinally, a representation to be transmitted mounted upon said spindle, said representation being formed on electrically conductive material, reader means bearing upon the surface of said representation and mounted in blocks fitting freely in a bearing member serving to accurately retain the reader members in adjusted position, perforator means arranged to be operated according to the electric current passed by said reader means and representation, a tape adapted for use in standard machines intermittently fed past said perforating machines at a rate bearing a predetermined ratio to the speed of revolution of said shaft, and means controlled by said punched tape for producing a visual reproduction of the representation transmitted.

10. Apparatus for use in photo-telegraphy comprising a spindle adapted to be rotated and simultaneously fed longitudinally, a plurality of representations to be transmitted mounted upon said spindle, said representations being formed on electrically conductive material, reader means bearing upon the surface of said representations and mounted in blocks fitting freely in a bearing member serving to accurately retain the reader members in adjusted position, perforator means arranged to be operated according to the electric current passed by said reader means and representation, a tape adapted for use in standard machines fed past said perforating machines at a rate bearing a predetermined ratio to the speed of revolution of said shaft, and means controlled by said punched tape for producing a visual reproduction of the representation transmitted.

11. A method of reproducing a representation such as a picture or the like, which consists in forming a non-pictorial intermediate record of said representation by marking said record with a series of markings adapted to modify light falling upon said record varying according to the tone values of small areas thereof, and then varying the intensity of light acting upon a light sensitive surface according to said markings so that said light produces upon said light-sensitive surface substantial duplicates of said original small areas.

12. In the art of transmitting a representation such as a picture or the like, those steps which consist in forming an intermediate non-pictorial record of the tone values of small areas of successive narrow zones of the picture the said record comprising equally spaced markings arranged in series and adapted to modify light falling upon said record, each said series corresponding to one of said narrow zones, the markings in alternate series being more numerous than the markings in the other series.

13. A non-pictorial record of a representation such as a picture or the like, in the form of a perforated tape having a plurality of perforations arranged in successive series, the number of perforations in each series varying in number according to the varying tone values of corresponding small areas of said picture.

14. A non-pictorial record of a representation such as a picture or the like, as claimed in claim 13 in which said perforated tape is of the form used in the automatic control of standard machines.

15. A non-pictorial composite record of a plurality of separate representations of a picture, each said representation corresponding to a given range of tone of said picture, said record comprising a plurality of discontinuous series of markings arranged in groups, each said series corresponding to one of said representations and the tone value corresponding thereto, each said group corresponding to the composite tone value of said representations at corresponding small areas thereof, so that the presence or absence of any said tone value at any said area is indicated by the presence or absence of the marking in the corresponding series in the said corresponding group of markings.

16. A method of automatically forming a non-pictorial representation which is not the visual equivalent of the original of a half-tone picture or the like, which consists in forming upon a strip of material a series of non-pictorial and sharply defined markings comprising a plurality of successive elements, the said elements corresponding to successive small zones of the said half-tone picture or the like, the area of each of said elements corresponding to the tone values of the respective small areas of the said picture, the areas comprised by the said successive elements having different electrical conductive properties than the portions of the strip intermediate the said elements.

17. A method according to claim 16 in which the said marking elements comprise sharply defined perforations.

18. A non-pictorial record which is not the visual equivalent of the original of a half-tone picture or the like, comprising a strip having a series of non-pictorial and sharply defined markings thereon, the said series comprising a succession of elements each of which corresponds to a small zone of the said picture or the like, the area of each said element corresponding to the tone value of the said zone, the areas occupied by the said elements having different electrical conductive properties than the portions of the said strip intermediate the said elements.

19. A non-pictorial representation of a picture comprising a tape having a plurality of zones arranged longitudinally of the tape, each zone corresponding to at least one of a multiplicity of elemental areas of the picture represented, the zones having cut out tone areas, the size of the total cut out tone area in any zone being a function of the tone value of an elemental picture area represented by that zone.

20. A non-pictorial representation of a picture having tone gradations, comprising a tape having a plurality of picture zones, each of which corresponds to at least one of a multiplicity of elemental areas of the picture represented, the zones being perforated in accordance with the tone values of the elemental picture areas represented, the perforations of some zones representing full tones and the perforations of other zones representing partial tones in accordance with the distribution of tones in the picture represented.

21. A non-pictorial representation of a picture having tone gradations, comprising a tape having a plurality of picture zones, each of which corresponds to one only of a multiplicity of elemental areas of the picture represented, the zones being perforated in accordance with the tone values of the elemental picture areas represented, the perforations of some zones representing full tones and the perforations of other zones representing partial tones in accordance with the distribution of tones in the picture represented.

22. A non-pictorial representation of a picture comprising a tape having a plurality of zones arranged longitudinally of the tape, each zone corresponding to at least one of a multiplicity of elemental areas of the picture represented, said zones having rows of tone perforations extending generally transversely of the tape, the tone perforations in any zone denoting the tone value of an elemental picture area represented by that zone.

23. A non-pictorial representation of a picture comprising a tape having a plurality of zones of equal size arranged longitudinally of the tape, each zone corresponding to at least one of a multiplicity of equal size elemental areas of the picture represented, said zones having rows of tone perforations extending generally transversely of the tape, the tone perforations in any zone denoting the tone value of an elemental picture area represented by that zone.

24. A non-pictorial representation of a picture comprising a tape having a plurality of zones of equal size arranged longitudinally of the tape, each zone corresponding to one only of a multiplicity of equal size elemental areas of the picture represented, said zones having rows of tone perforations extending generally transversely of the tape, the tone perforations in any zone denoting the tone value of the particular elemental picture area represented by that zone.

25. A non-pictorial representation of a picture comprising a tape having a plurality of zones of equal size arranged longitudinally of the tape, each zone corresponding to at least one of a multiplicity of equal size elemental areas of the picture represented, said zones having rows of tone perforations extending generally transversely of the tape, the tone perforations in any zone denoting the tone number of an elemental picture area represented by that zone with the tones being numbered from tone number one to tone number five, inclusive.

26. A non-pictorial representation of a picture comprising a tape having a plurality of zones of equal size arranged longitudinally of the tape, each zone corresponding to at least one of a multiplicity of equal size elemental areas of the picture represented, said zones having rows of tone perforations extending generally transversely of the tape, the tone perforations in any zone denoting the tone number of an elemental picture area represented by that zone with the tones being numbered from tone number one to tone number five, inclusive, and the tone number being given by the number of tone perforations in the row.

27. A non-pictorial representation of a picture comprising a tape having a plurality of zones of equal size extending longitudinally of the tape, each zone corresponding to one of a multiplicity of equal size elemental areas of the picture represented, said zones having rows of tone perforations extending generally transversely of the tape, the tone perforations in any zone denoting the tone number of the elemental picture area represented by that zone with the tones being numbered from tone number one to tone number five, inclusive, and the tone numbers being given by the number of tone perforations in the row.

28. A non-pictorial representation of a picture having actual tone gradations comprising a tape having a plurality of zones arranged longitudinally of the tape, each zone corresponding to one of a multiplicity of elemental areas of the picture represented, each zone having a cut out tone area the size of which is a function of the tone value of the elemental area of the picture corresponding to that zone.

29. A non-pictorial representation of a picture comprising a standard telegraphic tape adapted to operate standard telegraphic sending machines, the tape having a plurality of zones arranged longitudinally of the tape, each zone corresponding to at least one of a multiplicity of equal size elemental areas of the picture represented and the zones having depicted thereon the tone values of the elemental picture areas by perforation which are characteristic of the tone values depicted.

30. A non-pictorial representation of a picture having tone gradations, comprising a tape having tone perforations denoting the tone values of elemental areas of the picture.

31. A non-pictorial representation of a picture having tone gradations, comprising a tape having sets of code tone perforations, each set of tone perforations denoting the tone value of at least one of the multiplicity of equal size elemental areas of the picture.

32. A non-pictorial representation of a picture having tone gradations, comprising a tape having sets of code tone perforations, each set of tone perforations denoting the tone value of at least one of a multiplicity of elemental areas of the picture and the different perforations of a set being located at different distances from one of the edges of the tape.

33. A non-pictorial representation of a picture comprising a tape having sets of code tone perforations, each set of tone perforations denoting the tone value of one of a multiplicity of equal size elemental areas of the picture.

34. The method of analyzing a picture having actual tone gradations which comprises selecting elemental areas located in a first line of scanning, individually determining the tone values of said selected areas, selecting elemental areas located in an adjacent line of scanning and between the selected elemental areas of the first line of scanning, individually determining the tone values of the selected areas in said adjacent line of scanning, and continuing the scanning and tone determinations in like manner until the entire picture has been analyzed.

35. The method of making a non-pictorial representation of a picture having actual tone gradations which comprises selecting elemental areas located in a first line of scanning; individually determining the tone values of said selected areas; recording said determinations; selecting elemental areas located in an adjacent line of scanning and between the selected elemental areas of the first line of scanning; individually determining the tone values of the selected areas in said adjacent line of scanning; recording the latter determinations; and continuing the scanning, tone determinations, and recording in like manner until the entire picture has been recorded.

36. The method of analyzing a picture which comprises positively establishing reading points at intervals along a first line of scanning, the selection of points being independent of the character of the picture being scanned; making tone determinations at the established points; positively establishing reading points, in an adjacent line of scanning and between the points established in said first line, the selection of such points being also independent of the character of the picture being scanned; making tone determinations at the established points in said adjacent line of scanning; and continuing the establishment of reading points and the making of tone determinations in like manner until the entire picture has been analyzed.

37. The method of making a non-pictorial representation of a picture which comprises positively establishing reading points at intervals along a first line of scanning, the selection of points being independent of the character of the picture being scanned; making tone determinations at the established points; recording said determinations; positively establishing reading points in an adjacent line of scanning and between the points established in said first line of scanning, the selection of such points being also independent of the character of the picture being scanned; making tone determinations at the established points in said adjacent line of scanning; recording the last mentioned determinations; and continuing the establishment of reading points, tone determinations, and recording in like manner until the entire picture has been analyzed.

38. The method of reproducing a picture having actual tone gradations which comprises selecting elemental areas located in a first line of scanning, individually determining the tone values of said selected areas, selecting elemental areas located in an adjacent line of scanning and between the selected elemental areas in the first line of scanning, individually determining the tone values of the selected areas in said adjacent line of scanning, continuing the scanning and tone determinations in like manner until the entire picture has been analyzed, and synthesizing a replica of the original picture by forming elemental areas arranged in the same geometrical configuration as the elemental areas selected in said scanning and giving each elemental area of the replica the tone value determined for that elemental area.

39. The method of reproducing a picture having actual tone gradations which comprises selecting elemental areas located in a first line of scanning, individually determining the tone values of said selected areas, recording said determinations, selecting elemental areas located in an adjacent line of scanning and between the selected elemental areas of the first line of scanning, individually determining the tone values of the selected areas in such adjacent line of scanning, recording the latter determinations, continuing the scanning tone determinations and recording in like manner until the entire picture has been recorded, and synthesizing a replica of the original by forming elemental areas arranged in the same geometrical configuration as the elemental areas selected in said scanning and giving each elemental area of the replica a tone value equal to the tone value recorded from the corresponding elemental area during the scanning.

40. The method of reproducing a picture which comprises positively establishing reading points at intervals along a first line of scanning, the selection of points being independent of the character of picture being scanned; making tone determinations at the established points; positively establishing reading points in an adjacent line of scanning and between the points established in said first line, the selection of such points being also independent of the character of the picture being scanned; making tone determinations at the established points in said adjacent line of scanning; continuing the establishment of reading points and the making of tone determinations in like manner until the entire picture has been analyzed; and synthesizing a replica of the original picture by forming elemental areas in the same geometrical configuration as the reading points established during the scanning, each elemental area in the replica corresponding to an individual reading point, and giving each elemental of the replica the tone value determined for the corresponding reading point.

41. The method of making a representation of a picture which comprises positively establishing reading points at intervals along a first line of scanning, the selection of points being independent of the character of the picture being scanned; positively establishing reading points in an adjacent line of scanning and between the points established in said first line of scanning, the selection of such points being also independent of the character of the picture being scanned; continuing the establishment of reading points in like manner until the entire picture has been scanned; and synthesizing a replica of the picture by forming elemental areas arranged in the same geometrical configuration as the reading points and giving each elemental area at least an apparent tone value equal to the tone value of the corresponding reading point.

42. An apparatus for making a representation of a picture comprising means to scan the picture, means to make tone determinations at successive points along a series of lines of scanning with the points of one line positioned between the points of an adjacent line, and means to record each tone determination.

43. An apparatus for making a representation of a picture comprising means to scan the picture along a series of lines of scanning and make tone readings as the picture is scanned, means independent of the picture to locate the reading points of one line of scanning between the reading points of adjacent lines of scanning and to record the tone value read at each reading point.

44. An apparatus for making a representation of a picture comprising means to scan the picture along a series of lines of scanning, means operatively associated with the scanning means to record the tone value at any point selected along the lines of scanning, and means independent of the picture to select a series of points and thereby cause the recording of the tone values of such points.

45. An apparatus for making a representation of a picture comprising means to scan the picture along a series of lines of scanning, means operatively associated with the scanning means to record the tone value at any point selected along the lines of scanning, and means independent of the picture to select a series of points in each line of scanning with the selected points in any line being positioned between the selected points in an adjacent line.

46. An apparatus for making a representation of a picture comprising a cylindrical reproduction of the picture, means to scan the picture along a helical path, means operatively associated with the scanning means to record the tone value of any point selected along the helical path, and means to select a series of points and thereby cause the recording of the tones of such points.

47. An apparatus for making a representation of a picture comprising a cylindrical reproduction of the picture, means to scan the picture along a helical path, means operatively associated with the scanning means to record the tone value of any point selected along the helical path, and means independent of the picture to select a series of points and thereby cause the recording of the tones of such points, the selected points in each convolution of the helix being between the selected points in an adjacent convolution.

48. The method of transmitting a picture which comprises perforating a tape to form a non-pictorial representation of the picture, telegraphically transmitting the tape, and synthesizing a replica of the picture from the transmitted tape.

49. The method of transmitting a picture which comprises forming a standard telegraphic tape which is a non-pictorial representation of the picture, telegraphically transmitting the tape, and automatically synthesizing a replica of the picture from the transmitted tape.

50. The method of transmitting a picture which comprises perforating a tape to form a non-pictorial representation of the picture, telegraphically transmitting the tape, and controlling a light beam with the transmitted tape to synthesize a replica of the picture.

51. The method of transmitting a picture which comprises forming a standard telegraphic tape in the five unit code which tape is a non-pictorial representation of the picture, telegraphically transmitting the tape, and automatically controlling a light beam with the transmitted tape to synthesize a replica of the picture.

52. The method of transmitting a picture which comprises automatically forming a standard telegraphic tape which is a non-pictorial representation of the picture, telegraphically transmitting the tape, and automatically controlling a light beam with the transmitted tape to synthesize a replica of the picture.

53. A device for analyzing a picture comprising a plurality of representations of the picture, one representation having only such portions of the picture as contain a certain range of tones, another of the representations having only such portions of the picture as contain another range of tones, and so on; and means to scan all of the representations.

54. A device for analyzing a picture comprising a plurality of conducting surfaces, each conducting surface having a representation of the picture in the form of an insulating covering, the insulating covering of one representation corresponding to a certain range of tones in the picture, the insulating covering of another representation corresponding to another range of tones of the picture, and so on; a plurality of styles, one cooperating with each representation; and means to cause relative movement between the styles and the representations.

55. A device for making a representation of a picture comprising a plurality of reproductions of the picture, each reproduction having only such portions of the picture as contain a certain range of tones and the ranges of tones being different in the different reproductions; means to scan the reproductions to determine the tone values; and means to periodically record the tone determinations.

56. A device for making a representation of a picture comprising a plurality of conducting surfaces, each surface having a reproduction of the picture in the form of an insulating covering, each reproduction having only such portions of the picture as contain a certain range of tones with the ranges of tones being different in the different reproductions; means comprising a plurality of scanning styles to determine the tone values; and means to periodically record the tone determinations.

57. A device for analyzing a picture comprising a plurality of cylindrically shaped reproductions of the picture, each reproduction having only such portions of the picture as contain a certain range of tones and the ranges of tone being different in the different reproductions; a plurality of reader means, one cooperating with each reproduction; and means to cause relative movement between the representations and the reader means whereby each reader means traverses a helical path on its cylindrical reproduction.

58. A device for analyzing a picture comprising a plurality of cylindrical conducting surfaces, each surface having a reproduction of the picture in the form of an insulating covering, each reproduction having only such portions of the picture as contain a certain range of tones, with the ranges of tones being different in the different reproductions; means comprising a plurality of scanning styles to read the tone values of the reproductions, one style cooperating with each reproduction; and means to cause relative movement between the reproductions and the styles whereby each style traverses a helical path on its cylindrical reproduction.

59. An apparatus for reproducing a picture comprising means to support a sensitized surface in cylindrical form, means to project a beam of light upon the sensitized surface, means to cause relative movement between the beam of light and the sensitized surface whereby the beam traverses the surface from elemental area to elemental area in a helical path, a non-pictorial representation of the picture, and means to automatically control the beam of light in accordance with the non-pictorial record to obtain the desired degree of exposure of the elemental areas of the sensitized surface.

60. An apparatus for reproducing a picture comprising means to support a sensitized surface, means to project a beam of light upon the sensitized surface, means to cause relative movement between the beam of light and the sensitized surface whereby the beam traverses the surface from elemental area to elemental area, a non-pictorial record of the picture having sets of light transmitting tone areas characteristic of elemental areas of the picture, and means to pass the non-pictorial record in the path of the beam of light whereby the tone areas of the record permit the desired degree of exposure of the elemental areas of the sensitized surface.

61. An apparatus for reproducing a picture comprising means to support a sensitized surface in cylindrical form, means to project a beam of light upon the sensitized surface, means to cause relative movement between the beam of light and the sensitized surface whereby the beam traverses the surface from elemental area to elemental area in a helical path, a non-pictorial record of the picture having sets of light transmitting tone areas characteristic of elemental areas of the picture, and means to pass the non-pictorial record in the path of the beam of light whereby the tone areas of the record permit the desired degree of exposure of the elemental areas of the sensitized surface.

62. The method of reproducing a picture from a non-pictorial record having tone markings adapted to control a beam of light which comprises projecting a beam of light onto a sensitized surface and continuously moving the surface and the record in correlated relationship relative to the beam of light.

63. The method of reproducing a picture from a tape having picture zones provided with cut out tone areas characteristic of elemental areas of the picture which comprises projecting a beam of light onto a sensitized surface and continuously moving the sensitized surface and the tape in correlated relationship relative to the beam of light.

64. An apparatus for reproducing a picture comprising a sensitized surface, means to project a beam of light onto the sensitized surface, a non-pictorial record of the picture having sets of tone markings characteristic of elemental areas of the picture and adapted to control the beam of light when the record is passed in the path of the beam of light, and means to continuously move the sensitized surface and the record relative to the beam of light and correlate the movement of the sensitized surface and the record whereby the beam of light passes from elemental area to elemental area of the sensitized surface and the record controls the light to produce the desired exposure of each elemental area of the sensitized surface.

65. An apparatus for reproducing a picture comprising a sensitized surface, means to project a beam of light onto the sensitized surface, a tape having sets of cut out tone areas characteristic of elemental areas of the picture, and means to continuously move the tape and the sensitized surface in the path of the beam of light and correlate the movement of the sensitized surface and the tape whereby the beam of light passes from elemental area to elemental area of the sensitized surface and the tape controls the light to produce the desired exposure of each elemental area of the sensitized surface.

66. The method of analyzing a picture which comprises forming a plurality of reproductions of the picture, the different reproductions having different ranges of tones; and analyzing the plurality of reproductions.

HARRY GUY BARTHOLOMEW.
MAYNARD LESLIE DEEDES McFARLANE.